United States Patent [19]

Martin et al.

[11] Patent Number: 5,102,369
[45] Date of Patent: Apr. 7, 1992

[54] DARK MEAT DEBONER

[75] Inventors: Eugene Martin, Denver; Scott Cook, Strasburg, both of Pa.

[73] Assignee: Foodcraft Holdings, Inc., Wilmington, Del.

[21] Appl. No.: 690,822

[22] Filed: Apr. 26, 1991

[51] Int. Cl.⁵ ..................... A22C 21/00; A22C 17/00
[52] U.S. Cl. ..................... 452/135; 452/136
[58] Field of Search ............ 452/135, 136, 138

[56] References Cited

U.S. PATENT DOCUMENTS

| | | | |
|---|---|---|---|
| 4,644,608 | 2/1987 | Martin et al. | 452/136 |
| 4,669,150 | 6/1987 | Nanmoto et al. | 452/136 |
| 4,736,492 | 4/1988 | Hazenbroek et al. | 452/138 |
| 4,811,457 | 3/1989 | Lindert | 452/136 |
| 4,843,682 | 7/1989 | Bowen | 452/136 |
| 4,993,113 | 2/1991 | Hazenbroek | 452/136 |

*Primary Examiner*—Willis Little
*Attorney, Agent, or Firm*—Shoemaker and Mattare, Ltd.

[57] ABSTRACT

The tibula, fibia and femur of a whole poultry leg are removed by making a lengthwise cut along the inside of the leg, along the rear of the tibula and femur, then making a lateral cut part way through the knee joint, then supporting the thigh and bending the knee joint to expose the end of the femur, then plunging a cup-type knife over the exposed end of the femur and through the knee joint, to sever the ligaments in the joint and separate the exposed end of the femur from the thigh flesh, then moving the knife laterally of the femur axis to withdraw the femur through the lengthwise cut in the thigh, and then removing the tibula and fibia through the lengthwise cut in the drumstick. An apparatus for automatically performing a portion of the method is also disclosed.

10 Claims, 7 Drawing Sheets

DARK MEAT DEBONER

BACKGROUND OF THE INVENTION

This invention relates to the art of butchering, and more particularly to an apparatus for automatically removing the bones from whole poultry (especially chicken) legs.

There are numerous prior devices for removing bones from drumsticks, and some for deboning thighs. However, we are unaware of any prior device or method which debones whole legs, without separating the drumstick from the thigh.

Recently developed deboning machines have focused particularly on the breast, and the market has demonstrated high consumer acceptance of deboned breasts. The value of a breast can be significantly enhanced by removing the bones prior to sale. It now appears that a similar market exists, or would exist, for deboned whole chicken legs. The present invention addresses the problem of removing bones from whole legs, which present problems different from, and in some respects more difficult than, breasts.

SUMMARY OF THE INVENTION

In view of the foregoing, it is an object of this invention to remove entirely the bones from a whole chicken leg, without severing the drumstick from the thigh, and without any substantial removal of flesh. A related object is to produce a boned leg product which is attractive and cleanly cut, and free of tendons and ligaments.

Another object is to automate the tediously repetitive operation of boning legs in a poultry processing plant.

It should be understood that, although refer to chicken legs throughout this document, the method and apparatus disclosed would be easily adapted to other birds, or even other animals generally, and that the invention claimed is intended to cover all such uses.

The above objects are met by an apparatus comprising a frame and a leg conveyor thereon, the conveyor having means for engaging the hock of the leg (the large joint at the bottom of the drumstick, the feet having previously been removed), whereby the conveyor moves a series of legs through a deboning station.

The apparatus performs part of a method for deboning whole legs, which is part of the invention as well. The method comprises making a lengthwise cut along the inside of the leg, over substantially its entire length, down to and along the rear of the tibula and femur, then making a lateral cut part way through the knee joint, then supporting the thigh and bending the knee joint in its natural direction until the femur and tibula are at an acute angle to expose the knee joint, then plunging a cup-type knife over the exposed end of the femur and through the knee joint, to sever the ligaments in the joint and separate the exposed end of the femur from the thigh flesh, then, without fully withdrawing the knife, moving it laterally of the femur axis to withdraw the femur through the lengthwise cut in the thigh, and then removing the tibula and fibia through the lengthwise cut in the drumstick.

Common terminology (such as "hock", "drumstick", and "knee") is used throughout this specification, instead of corresponding proper anatomical terms, for the benefit of the ordinary reader.

BRIEF DESCRIPTION OF THE DRAWINGS

In the accompanying drawings.

DESCRIPTION OF THE PREFERRED EMBODIMENT

Figure 1:
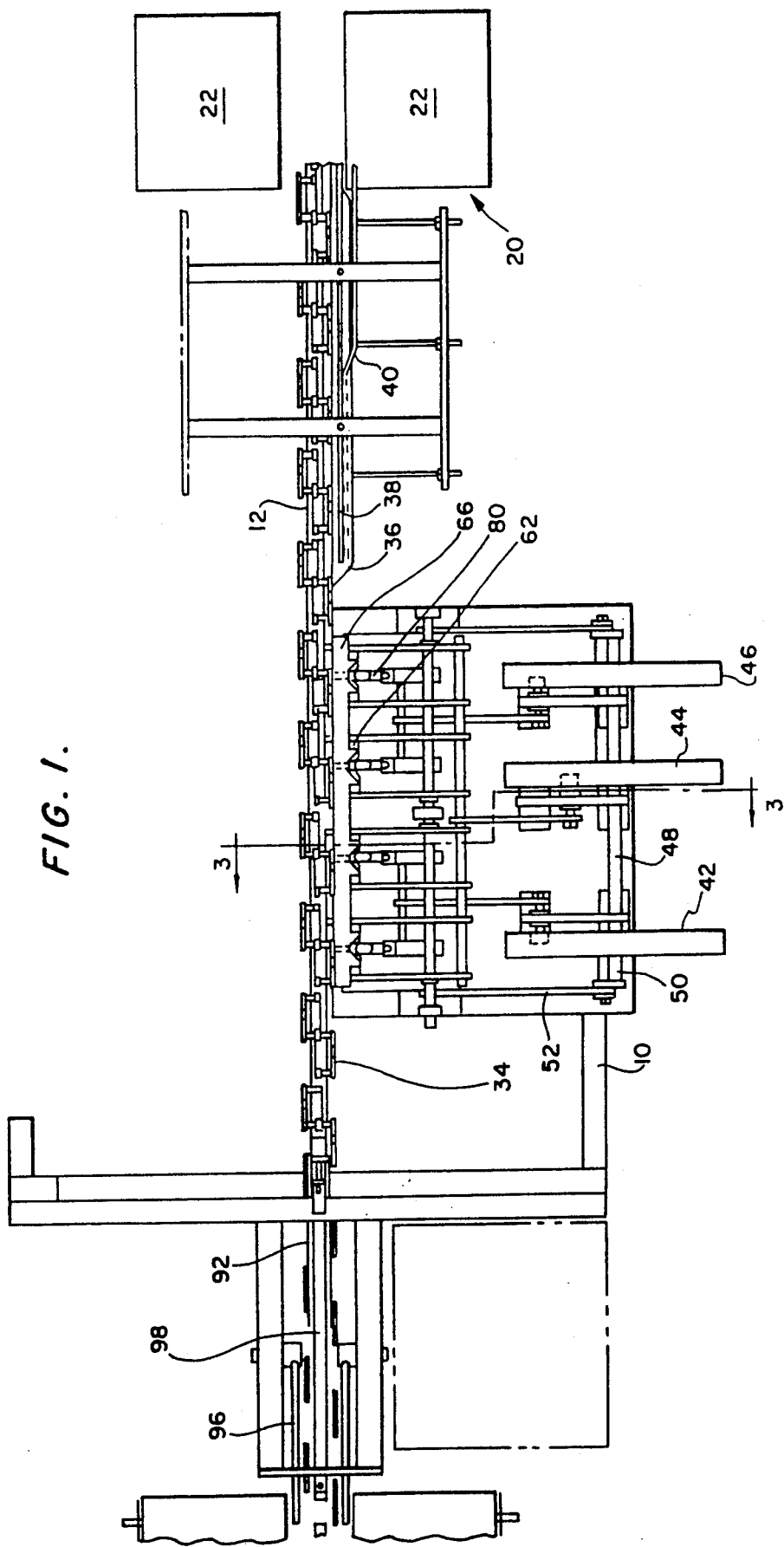
FIG. 1 is a top plan view of an apparatus embodying the invention.

An apparatus embodying the invention comprises a frame 10, shown generally in FIG. 1, which supports a linear, horizontal chain conveyor passing along a vertical center plane P from an upstream end to a downstream end, as indicated by the arrow. The conveyor is driven intermittently by a conventional mechanism, not shown, including an electric motor and a right-angle gear reduction unit.

At the upstream end of the apparatus, there is a joint preparation station 20, where preliminary cutting steps are presently performed manually. It may be possible to automate the cutting steps, which are described in detail below with the operation of the apparatus.

The joint preparation station comprises horizontal surfaces 22 on either side of the chain conveyor, where workers can orient and partially cut whole chicken legs. The broken lines toward the top of the Figure are intended to indicate that there is corresponding structure on either side of the center plane, and in fact the entire apparatus is substantially symmetrical. To avoid duplication, only structure on one side of the center plane is shown in detail.

Figure 5:
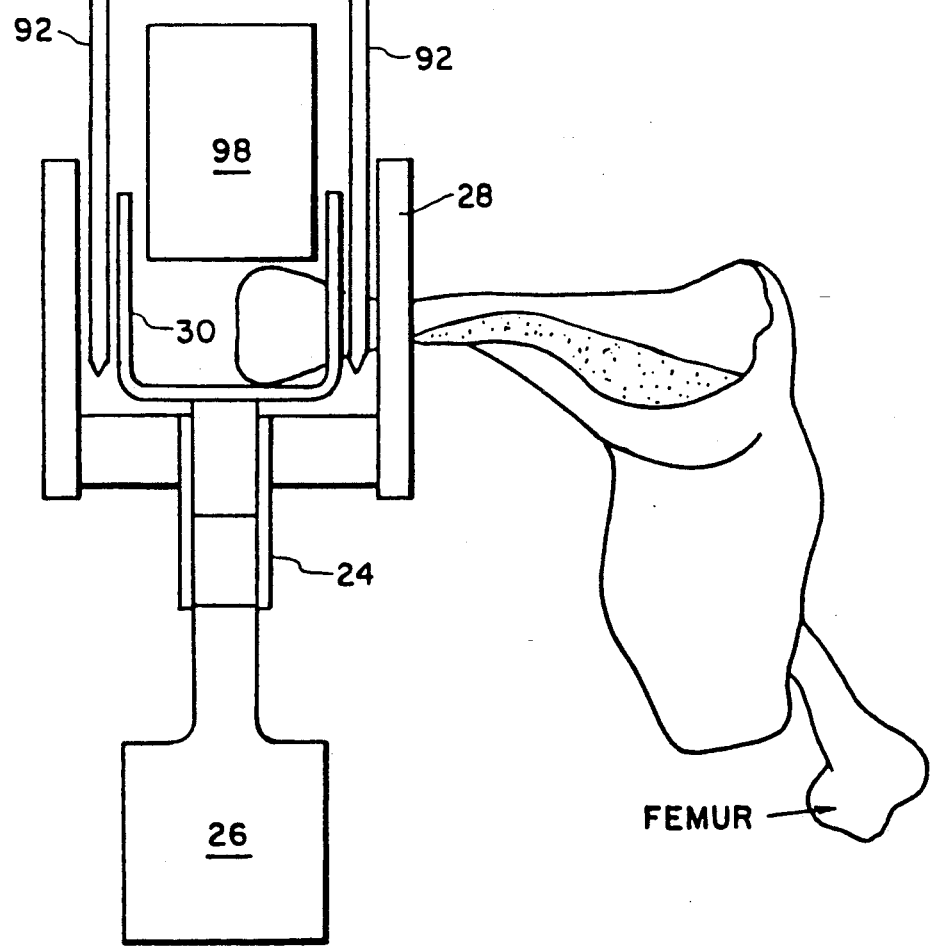
FIG. 5 is a sectional view taken along the plane 5—5 in FIG. 2.
Figure 6:
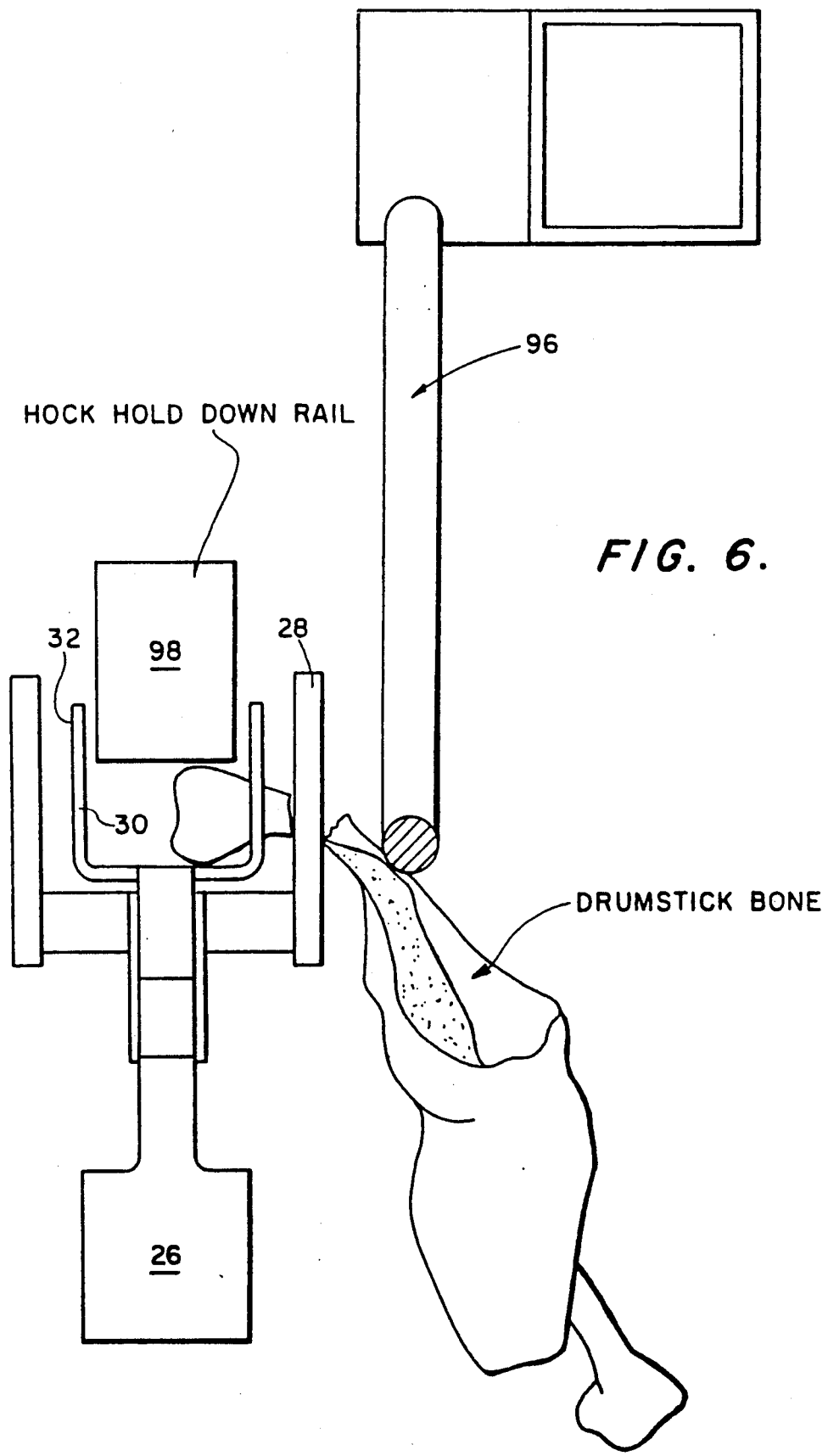
FIG. 6 is a sectional view taken along the plane 6—6 in FIG. 2.

"Whole chicken leg" herein means the thigh and drumstick, connected at the knee joint, without the feet, which have previously been removed, so that the drumstick terminates at the hock, which is the end corresponding to the ankle joint. A leg is illustrated in FIGS. 5 and 6. As best seen in those figures, and in FIG. 2, the conveyor 12 comprises a single No. 60 (¾ inch pitch) chain 24 riding on a UHMW plastic guide 26, and provided, on either side, with pairs of tabs 28, 30 at seven-and-a-half inch intervals.

Each tab pair has a space 32 therebetween, and a transverse slot 34 sized to receive the distal end of a drumstick, but too narrow for the hock to pass through. The slot is cut at a compound angle, so that the center of the slot extends, in a direction away from the center plane, preferably 40° rearward (i.e., in the upstream direction) and 30° downward, to properly orient the drumstick for the deboning operation.

Just downstream of the joint preparation station, the drumstick is engaged from below by a channel member 36 extending parallel to the conveyor direction, just below and outside the bottom of the tab slots, and from above by two stationary rods extending generally in the direction of the conveyor. The inboard of these rods, 38, slightly closer to the center plane than the innermost tabs, keeps the hock within the slots. The outboard rod 40 descends in the downstream direction, and curls partially around the channel iron, so that as the leg progresses downstream, the knee is flexed and the thigh is partially inverted, with the longitudinal cut in the thigh facing down and away from the conveyor.

The femur removing station occupies the center portion of FIG. 1, in which structure on only one side of the center plane is shown. It may be mentioned here that the conveyor chain moves intermittently, stroking thirty inches per cycle. Since the tab spacing is a quarter of this distance, four legs are advanced per stoke, and the four are acted upon simultaneously during the dwell period in the femur removing station.

Figure 3:
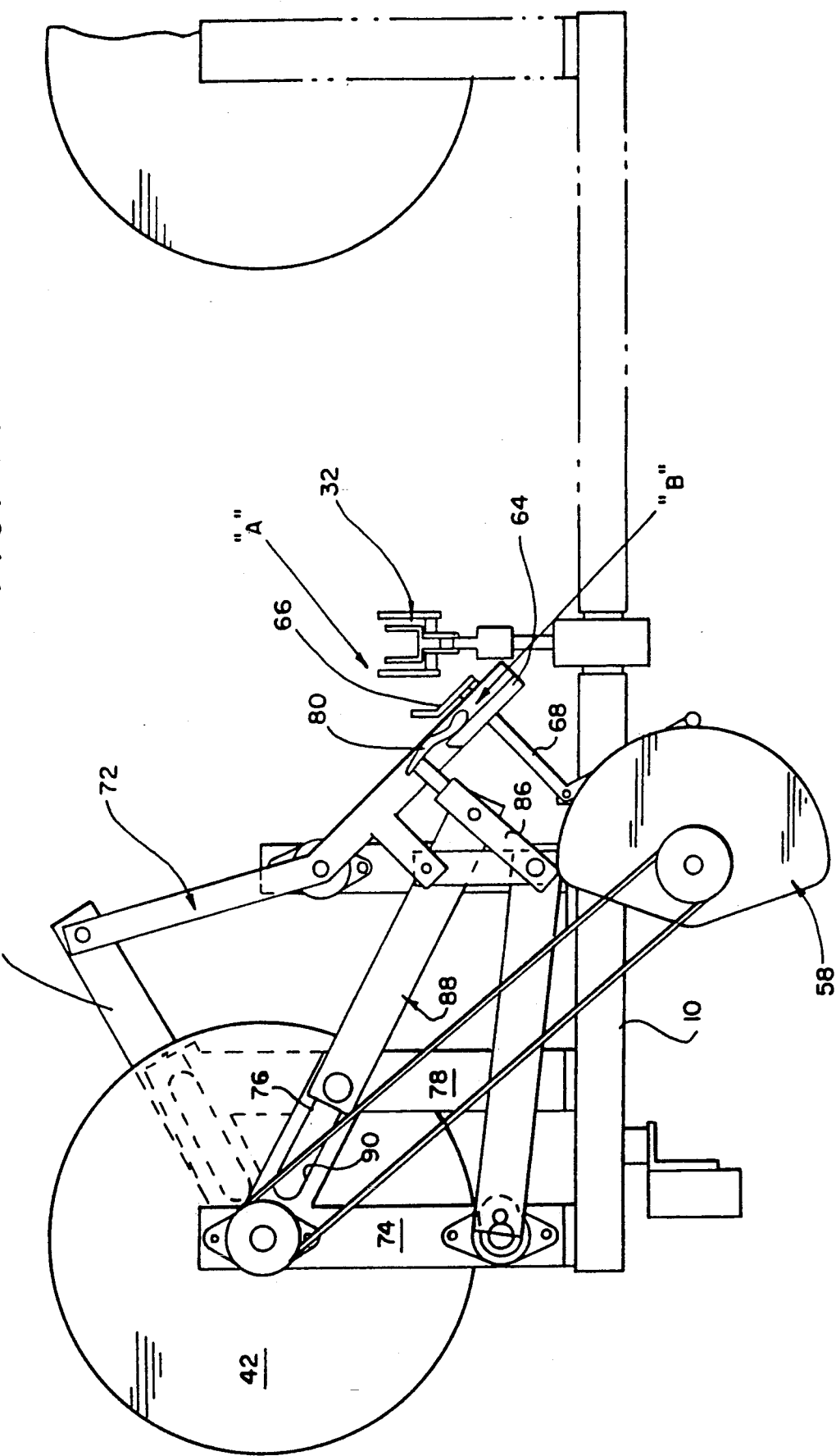
FIG. 3 is a sectional view taken along the transverse plane 3—3 in FIG. 1.

Details of the femur removing station are shown in the top and lateral view of FIGS. 1 and 3, from which unessential detail has been omitted. The mechanism shown comprises three large cams 42, 44, 46, the outer two of which are identical and drive the plunge knives described below; the middle cam 44 drives a thigh clamp. The cams are mounted on a common shaft 48 which extends parallel to, and is driven through gearing (not shown) by, a crankshaft 50 having a Pittman arm 52 with a small stroke, that controls the position of the pivot point 54 of the knife arm 56. Although the crankshaft movement is continuous, the conveyor movement is synchronized with it, mechanically or electrically, at one cycle per crankshaft revolution, and the cams have dwell events in which the knife is retracted, during movement of the conveyor. The lowermost cam 58 (FIG. 3) operates a thigh clamp 60 which immobilizes the femur and properly positions it for the plunge knife. Structural members 74, 76, 78 are stationary, being connected to the frame 10.

The thigh clamp 60 includes an anvil 62 comprising a metal support and two stiff but deflectable polyethylene members 64 (or "squeegees") which are connected to the support at their outer edges only. The squeegees meet, or nearly meet, edge-to-edge opposite a dwell position of one of the conveyor tab slots and astride a transverse plane containing the centerline of the plunge knife, defining between them a slit or slot through which the femur can be drawn, but not the entire thigh. The squeegees (see FIG. 8) are stiff enough to provide a substantial supporting force for the thigh, but sufficiently resilient to allow the slot to open slightly as the femur is drawn through.

The thigh is clamped against the squeegee surface from above by a "cradle" 66, which is drawn from an upper rest position toward the squeegees by the link 68 driven by cam 58. The anvil itself is moved by the cam 44 via a follower on link 70, and lever 72, between a lower rest position and an upper working position. Thus, the pocket formed between the squeegees and the cradle is open at rest (while the conveyor is moving), and closed around the thigh during deboning.

Figure 7:
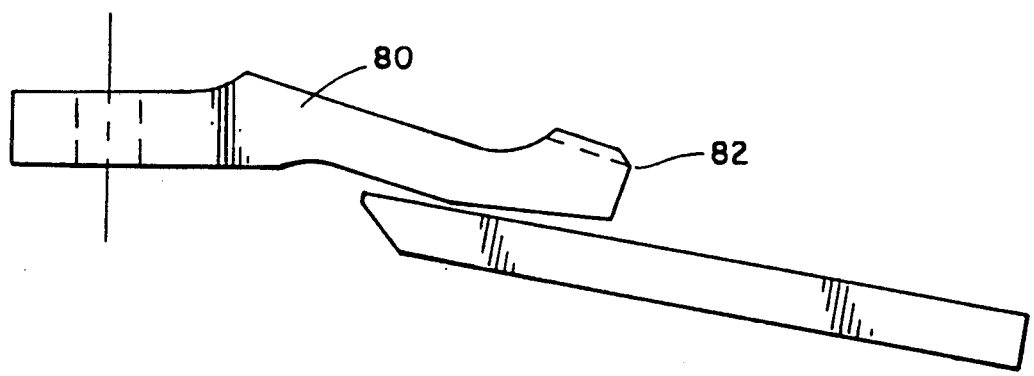
FIG. 7 is a an enlarged side elevation of a plunge knife shown in FIG. 3.
Figure 8:
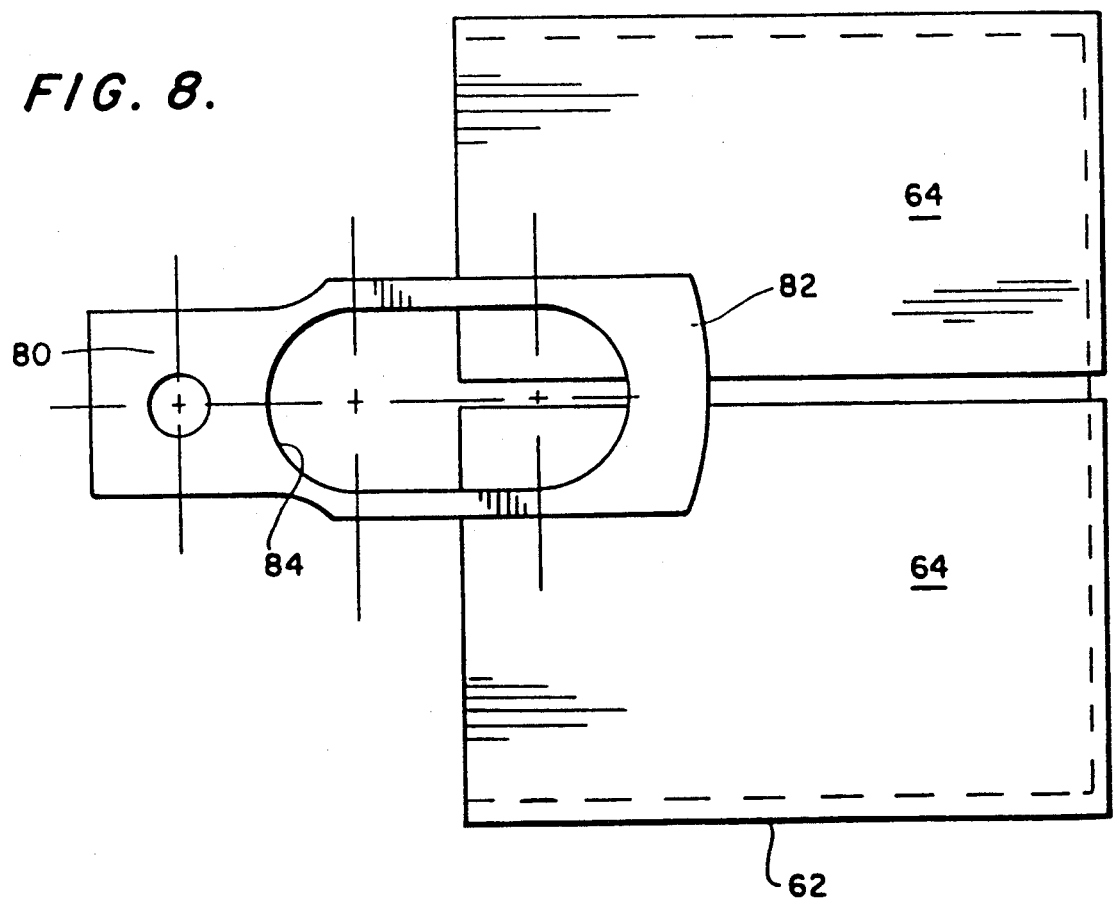
FIG. 8 is a view of the plunge knife, taken in direction "A" in FIG. 3.

FIGS. 7 shows the plunge knife 80 in detail, viewed along direction "A" in FIG. 3. The mounting hole by which the knife is connected to its arm is shown at the left side of the drawing; the cutting edge 82 is depicted at the right. The upper surface of the knife, adjacent the cutting edge, defines a cylindrical arc. The upper edge is beveled at 45°, and, as indicated by the broken line, the cutting edge forms a circular arc. The oval opening 84 at the center of FIG. 8 provides clearance for the end of the femur.

The lower end of the knife arm is pivotally connected to the link 86 suspended from the lever 72, and also to the pittman, which varies the location of the pivot point during the cycle. As will be explained, the movement and orientation of the knife is critical to the deboning process. The upper end of the knife arm is oscillated with respect to the pivot point by the link 88, which is driven by cam 42 or 46 via a follower that is constrained to move within a slot 90 in the stationary member 76. It should be noted that the four knives operate in unison, each pair of the knives being driven by a respective one of the cams. Also, the four squeegee supports, and the cradles are ganged together, or are unitary, and operate together.

Figure 4:
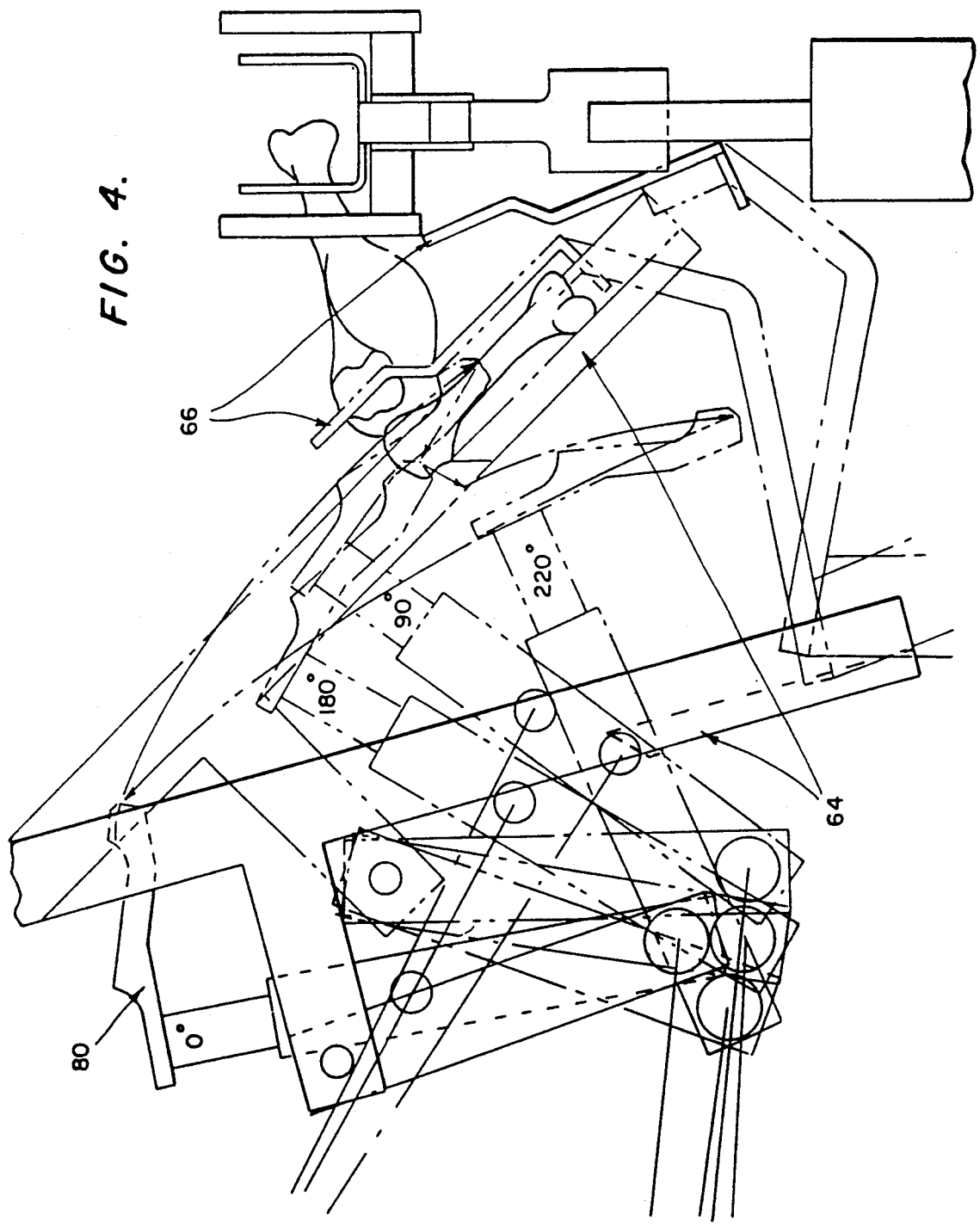
FIG. 4 is an enlarged view of a portion of FIG. 3.

FIG. 4 shows successive positions of the knife, which are produced by the cooperative effect of the cams 42, 44, 46, 58, and links 52, 70, 72, 86, 88. The degree markings denote cam positions, 0° being the middle of the dwell event. The sequence is described below with the operation of the device.

Figure 2:
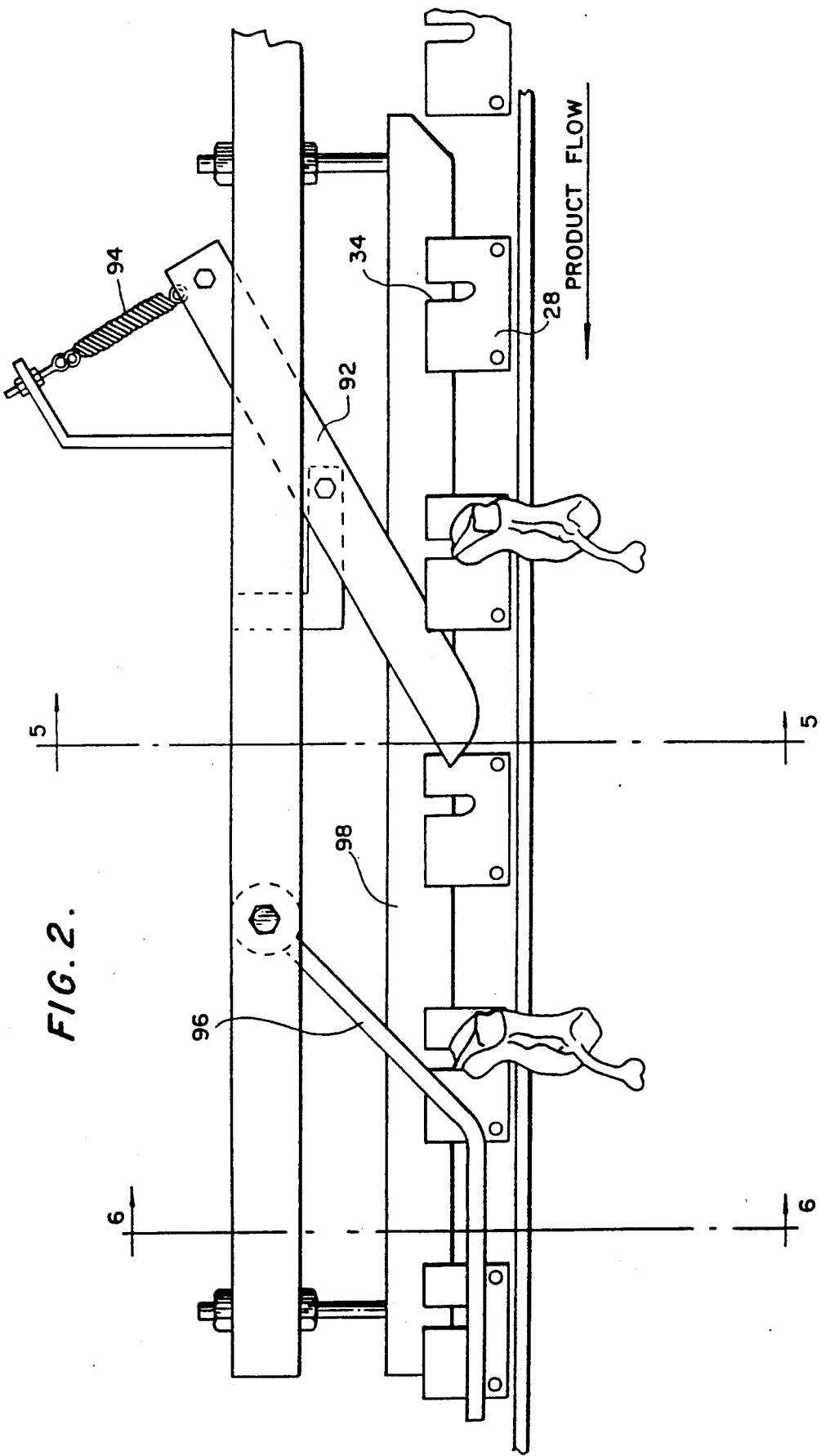
FIG. 2 is a front elevation of a portion thereof.

Downstream of the femur removing station, the conveyor chain passes through a final station for nicking the tibula, to weaken it, and then breaking the tibula. This station is shown in FIGS. 2, 5 and 6. As shown in FIGS. 2 and 5, the conveyor 12 carries the leg by its hock beneath a pivotally supported knife 92, which is biased downward by a spring 94. Thereafter, the drumstick is engaged from above by a stationary breaking bar 96, which descends in the downstream direction. An inboard bar 98 keeps the hock in the slot.

In operation, workers at the upstream end of the apparatus receive quantities of whole legs at the joint preparation station. Each leg is delivered to the appropriate side of the apparatus; the legs cannot be loaded indiscriminately. Actually, looking in the downstream direction from the preparation station, the right legs of the bird are processed by the left side of the machine, and vice-versa. Each leg is placed on the work surface of the preparation station with the hock toward the center plane and the inside of the leg up, that is, with the knee rearward. Now, an incision or cut is made through the flesh on the inside of the leg, from the hock to the hip, along the downstream side of the tibula and femur. The leg is not cut through, but just deep enough to pass along the bone. Next, a lateral cut is made into the knee joint on the exposed (inner) side of the leg.

The leg, now ready for automatic processing, is now loaded into the next available conveyor tab slot. When the conveyor is cycled, the leg is passed to one of the four identical sites at the deboning station, after the knee has been flexed by the bar 40. During the dwell period of the conveyor, with the hock still firmly within the tab slots, the following events occur in rapid succession: First, the squeegee support is moved upward and toward the conveyor by the cam 44, further opening the knee joint, which is still held together by the ligaments at the outside of the knee. Nearly simultaneously, the cradle is driven toward the squeegee, compressing the thigh so as to immobilize the femur. The plunge knife now moves downward, substantially along both the axis of the femur and that of the knife, roughly direction "A" in FIG. 3, so that the cutting edge of the knife passes between the femur and the tibula, severing the remaining uncut ligaments, and also separating the end of the femur from the surrounding thigh meat.

The knife now undergoes a particularly critical motion, illustrated in FIG. 4. It is withdrawn somewhat in the direction it entered, but only partially—to a point at which the cutting edge is still adjacent the femur. Next, owing to the lateral shifting of the location of the pivot point of the knife arm, in conjunction with the movement of the knife driving link, the knife moves substantially perpendicular to the femur axis, that is, in direction "B" (FIG. 3), and thereafter a substantial distance approximately vertically downward, as shown. Since the femur has been freed already at its knee end, and because the lengthwise cut previously made is now on the bottom of the thigh, the femur can pass out of the thigh meat, through the slot between the squeegees, which prevent the thigh meat from following.

As it happens, the femur usually remains loosely connected to the thigh by some flesh near the hip, but it can be easily removed later by hand or otherwise. FIG. 2 illustrates the femur dangling from the thigh, downstream of the deboning station. By following the arrow in FIG. 2, one can see that the thigh first passes under the knife, which nicks the tibula near the hock (FIG. 5), providing a locus for breaking when the leg is forced downward by the breaking bar (FIG. 6). It is then a simple matter to remove the hock, to withdraw the tibula and fibia through the lengthwise cut, and to sever and tissues remaining connected to the femur, without damaging the product. A unitary boned whole leg results.

Inasmuch as the invention is subject to modifications and variations, it is intended that the foregoing description and the accompanying drawings shall be interpreted as illustrative of only one form of the invention, whose scope is to be measured by the following claims.

I claim:

1. A method for removing the femur from a whole poultry leg, without separating the drumstick from the thigh, comprising steps of making a lengthwise cut along the inside of the leg, over substantially its entire length, down to and along the rear of the tibula and femur, then making a lateral cut part way through the knee joint, then cutting through the knee joint, and withdrawing the femur through the lengthwise out in the thigh, and then removing the tibula and fibia through the lengthwise cut in the drumstick.

2. A method for removing the femur from a whole poultry leg, without separating the drumstick from the thigh, comprising steps of making a lengthwise cut along the inside of the leg, over substantially its entire length, down to an along the rear of the tibula and femur, then making a lateral cut part way through the knee joint, then supporting the thigh and bending the knee joint in its natural direction until the femur and tibula are at an acute angle to expose the knee joint, then plunging a cup-type knife over the exposed end of the femur and through the knee joint, to sever the ligaments in the joint and separate the exposed end of the femur from the thigh flesh, then, without fully withdrawing the knife, moving it laterally of the femur axis to withdraw the femur through the lengthwise cut in the thigh, and then removing the tibula and fibia through the lengthwise cut in the drumstick.

3. An apparatus for removing the bones from a poultry leg which has been prepared by making a lengthwise cut along the inside of the leg, along the femur and tibula, and a transverse cut through only the inside of the knee joint, comprising means for holding the drumstick portion of the leg by the hock, means for gripping the thigh of the leg and flexing the leg, to expose the knee joint and the knee end of the femur, a semicylindrical knife and means for plunging the knife substantially along its axis over the exposed end of the femur, to sever the knee joint, and means for moving the knife laterally of the femur axis, without withdrawing it from the femur, so as to pull the femur through the lengthwise cut.

4. The invention of claim 3, further comprising a conveyor for moving the leg along a predetermined path in a predetermined orientation, and wherein the hock holding means is affixed to the conveyor.

5. The invention of claim 4, wherein the hock holding means comprises a pair of spaced tabs, each having a slot therein through which the hock cannot pass.

6. The invention of claim 3, wherein the knife is mounted on an arm having a pivot support, and the knife moving means comprises a link for oscillating the arm with respect to the pivot, a first cam for driving the arm cyclically, and means for laterally moving the pivot support in synchronization with the first cam.

7. The invention of claim 6, wherein the moving means comprises a crankshaft driven at the same speed as the first cam, and a pittman arm extending between the crankshaft and the pivot support.

8. The invention of claim 3, wherein the thigh gripping means comprises an anvil formed of two opposed resilient members with a slot therebetween through which the femur can pass, and a cradle for clamping the thigh against the anvil.

9. The invention of claim 8, further comprising a second cam for operating the thigh anvil, and means for rotating said second cam in unison with said first cam.

10. The invention of claim 8, further comprising a third cam for operating the thigh cradle, and means for rotating said third cam in unison with said first cam.

* * * * *